United States Patent
Takeda

(10) Patent No.: US 6,731,573 B2
(45) Date of Patent: May 4, 2004

(54) OPTICAL DISK DEVICE WITH MEANS FOR ADJUSTING WRITING FOCUS OFFSET

(75) Inventor: Naoto Takeda, Tokyo (JP)

(73) Assignee: TEAC Corporation, Tokyo (JP)

( * ) Notice: Subject to any disclaimer, the term of this patent is extended or adjusted under 35 U.S.C. 154(b) by 3 days.

(21) Appl. No.: 10/170,835

(22) Filed: Jun. 12, 2002

(65) Prior Publication Data
US 2002/0191504 A1 Dec. 19, 2002

(30) Foreign Application Priority Data
Jun. 15, 2001 (JP) .......................... 2001-181834

(51) Int. Cl.$^7$ ................................. G11B 7/00
(52) U.S. Cl. .................. 369/44.29; 369/47.51; 369/47.53
(58) Field of Search ................ 369/116, 44.29, 369/47.5, 47.51, 47.53, 47.55

(56) References Cited

U.S. PATENT DOCUMENTS

| | | | | |
|---|---|---|---|---|
| 5,561,645 A | * | 10/1996 | Eastman et al. | 369/44.29 |
| 5,790,482 A | * | 8/1998 | Saga et al. | 369/13 |
| 5,828,636 A | | 10/1998 | Matsumoto et al. | |
| 6,240,055 B1 | * | 5/2001 | Takamine et al. | 369/44.29 |
| 6,424,608 B1 | * | 7/2002 | Takeuchi | 369/47.53 |

FOREIGN PATENT DOCUMENTS

| | | |
|---|---|---|
| JP | 2000285485 A | 10/2000 |
| JP | 2001052351 A | 2/2001 |

* cited by examiner

Primary Examiner—Nabil Hindi
(74) Attorney, Agent, or Firm—Christensen O'Connor Johnson Kindness PLLC

(57) ABSTRACT

In an optical disk device in which the focus offset for writing of data can be optimized, a mark is written onto an optical disk at a predetermined focus offset and a change in the signal quality is detected by replaying the mark at various focus offsets. The predetermined focus offset is adjusted based on the change in the signal quality so that the focus offset is set at an optimal value. When an error rate is employed to represent the change in the signal quality, a range of focus offset in which the error rate does not exceed a predetermined value is found. By adjusting the predetermined focus offset for the reference optical disk based on the detected range of focus offset, an optimal focus offset is set.

18 Claims, 15 Drawing Sheets

OPTICAL DISK DEVICE WITH MEANS FOR ADJUSTING WRITING FOCUS OFFSET

BACKGROUND OF THE INVENTION

1. Field of the Invention

The present invention relates to an optical disk device, and in particular, to optimization of focus offset when data is written onto a recordable optical disk.

2. Description of the Related Art

Recordable or rewritable optical disk devices such as DVD-RAMs and the like have been developed and are being commercialized.

In order to write data accurately onto such recordable or rewritable optical disks, writing power must be optimized and, to optimize power, the focus offset for writing must be optimized. To this end, the optimal focus offset for replaying is used as the focus offset for writing. Alternatively, as disclosed in Japanese Patent Laid-Open Publication No. 2001-52351, the optimal focus offset for writing may be determined by varying the focus offset while writing data and then evaluating the replay quality.

However, because the optimal focus offset for replaying may not necessarily be identical to the optimal focus offset for writing, there had been a problem in that a high-grade writing may not be possible even when the optimal focus offset for replaying is used when writing.

FIG. 15 shows changes in RF level and jitter for replay signals when data is replayed while the focus offset is varied. As shown, the jitter is minimized and the RF level is maximized at the optimal focus offset For. When the focus offset is varied from the optimal value when the objective lens for optical pickup is moved towards or away from the optical disk, jitter and RF level are degraded.

FIG. 16 shows changes in RF level and jitter when data are written while the focus offset is varied and then replayed at the optimal focus offset For as shown in FIG. 15. At the optimal focus offset Fow, the jitter is minimized and the RF level is maximized. When the focus offset is varied by moving the objective lens towards or away from the optical disk and data is written, jitter and RF level are degraded.

FIG. 17 shows the relationship between the optimal focus offset For for replaying as shown in FIG. 15 and the optimal focus offset Fow for writing as shown in FIG. 16. As is clear from FIG. 17, the optimal focus offset For for replaying does not coincide with the optimal focus offset Fow for writing and there is a difference between the two focus offsets. Thus, even when data is written using the optimal focus offset For for replaying, for example, the jitter may not necessarily be minimized and the error rate or the like may increase.

On the other hand, this problem can be solved by determining the optimal focus offset Fow based on the characteristics shown in FIG. 16 and setting the offset of the optical disk device to Fow. However, the optimal focus offset Fow is determined for a reference optical disk, and is not necessarily an optimal value for each optical disk on which data is to be written. In particular, because a particular individual may select any disk from among the many optical disks are available on the market, writing at a fixed focus offset may sometimes not be appropriate. While it is possible to determine an optimal focus offset for writing every time a new optical disk is loaded, this requires that data be written while the focus offset is varied and that the writing power be optimized through separate optimization processes: this, in turn, requires relatively long processing time.

SUMMARY OF THE INVENTION

Accordingly, an object of the present invention is to provide a device in which data can be consistently written onto an optical disk at an optimal focus offset.

According to one aspect of the present invention, there is provided an optical disk device comprising means for writing a mark onto an optical disk at a predetermined focus offset; means for replaying the mark while varying the focus offset; means for detecting a change in the quality of a replay signal with respect to the variation of the focus offset; and means for adjusting the predetermined focus offset based on the change in the quality of the replay signal. The means for writing writes data onto the optical disk at the focus offset adjusted by the means for adjusting. There is a relationship between the optimal focus offset for writing and changes in the quality of replay signals with respect to variations in the focus offset when replaying, and this relationship is approximately a constant and independent of optical disks. More specifically, although the optimal focus offset for writing differs for each optical disk, the relationship between the optimal focus offset for writing and changes in the quality of the replay signal is approximately constant and is independent of the optical disks. According to the present invention, this relationship is employed for obtaining the optimal focus offset for writing for each optical disk.

According to another aspect of the present invention, it is preferable that a change in the error rate with respect to the variation of the focus offset is used as the change in the quality of the replay signal with respect to the variation of the focus offset. As the change in the quality of the replay signal with respect to the variation of the focus offset, a change in jitter with respect to the variation of the focus offset or a change in RF level with respect to the variation of the focus offset may also be preferably used.

According to yet another aspect of the present invention, the optical disk device further comprises means for storing the relationship, for a reference optical disk, between the predetermined focus offset and the change in the error rate. The means for adjusting adjusts the predetermined focus offset based on the relationship, for the reference optical disk, between the predetermined focus offset and the change in the error rate, and a change in the error rate, in the optical disk, with respect to the variation of the focus offset and sets as the optimal focus offset for the optical disk onto which data is to be written. The means for storing may also store the relationship, for a reference optical disk, between the predetermined focus offset and the change in jitter or may store the relationship, for a reference optical disk, between the predetermined focus offset and the change in the RF level.

The present invention can be more readily understood by referring to the following embodiments. The embodiments, however, are presented as examples only, and are not intended in any way to limit the scope of the present invention.

BRIEF DESCRIPTION OF THE DRAWINGS

FIG. 17 is a graph showing the relationship between Fow and For.

DESCRIPTION OF THE PREFERRED EMBODIMENT

Figure 1:
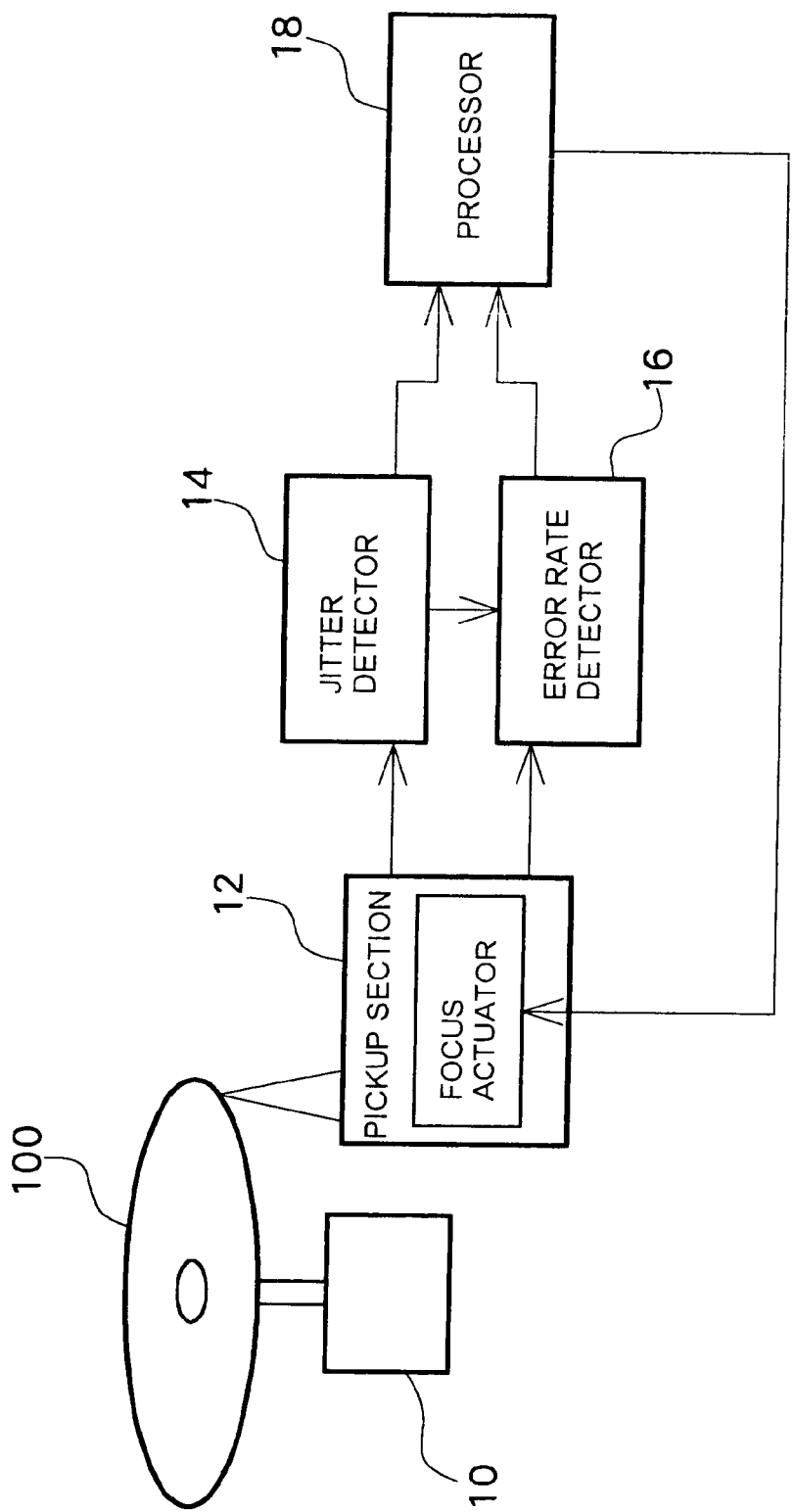
FIG. 1 is a diagram showing significant components of an optical disk device.

The preferred embodiment of the present invention (hereinafter referred to simply as "the embodiment") will now be described while referring to the drawings, by describing an example case wherein data is written onto a phase-change rewritable optical disk.

FIG. 1 is a diagram showing the significant components of an optical disk device according to the embodiment. The optical disk device comprises an optical pickup section 12, a jitter detector 14, an error rate detector 16, and a processor 18.

The optical pickup section 12 irradiates a beam of laser light onto an optical disk 100 which is rotationally driven by a spindle motor 10 for writing or replaying, and outputs a replay RF signal to the jitter detector 14 and error rate detector 16. Three laser powers are used, a bias level, an erase level, and a peak level, for replaying at the bias level, deleting at the erase level, and writing at the peak level.

Figure 16:
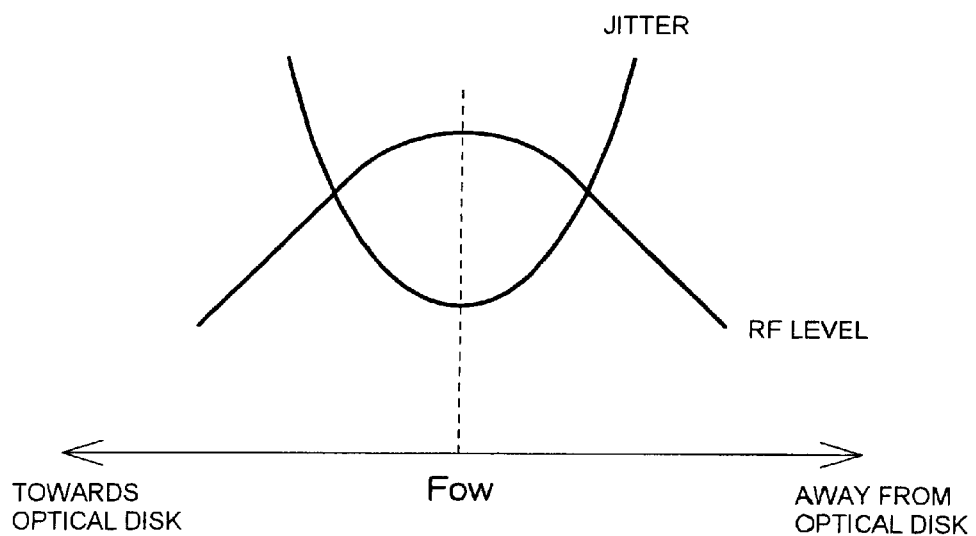
FIG. 16 is a graph showing changes in the RF level and jitter when the focus (FS) offset for writing is varied.
Figure 17:
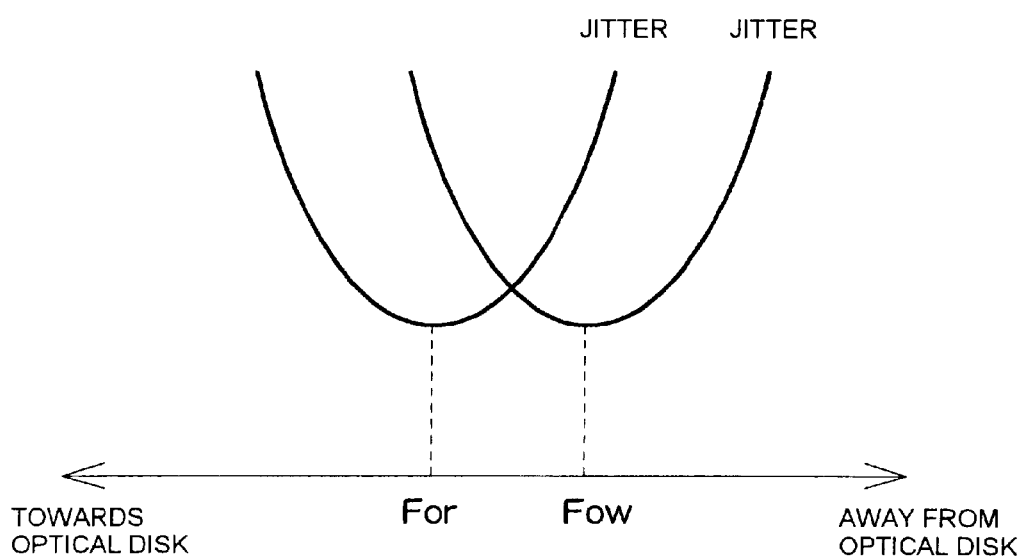

The jitter detector 14 detects jitter in the replay RF signal from the optical pickup section 12. In the embodiment, when the device is shipped from the factory, marks are written onto a predetermined region of a reference optical disk while varying the focus offset and jitter is detected when the marks are replayed. The characteristics of jitter when the marks are written while the focus offset is varied is shown in FIG. 16. The detected jitter is supplied to the processor 18 and the optimal focus offset for writing at the time of shipping, that is, the optimal focus offset for writing for the reference optical disk, is determined.

The error rate detector 16 detects the error rate in the replay RF signal from the optical pickup section 12. In the embodiment, when the device is shipped from the factory, a mark is written at the optimal focus offset for writing for the reference optical disk as described above and error rate is detected when the mark is replayed while the focus offset is varied. In addition, when a user writes data onto an optical disk after the device has been shipped from the factory, the error rate is detected by replaying the mark written at the optimal focus offset for writing as described above while the focus offset is varied. The detected error rate is supplied to the processor 18.

When the device is shipped from the factory, the processor 18 determines the optimal focus offset for writing based on the jitter value from the jitter detector 14. in addition, when the device is shipped from the factory, the relationship between the optimal focus offset and the error rate is calculated based on the error rate for the reference optical disk obtained from the error rate detector 16. Then, after the device is shipped from the factory, the optimal focus offset for writing which has been determined when the device is shipped is adjusted based on this relationship and an error rate of an optical disk onto which a user wishes to write data. Furthermore, a control signal is supplied to a focus actuator of the optical pickup 12 so that the focus offset of the optical pickup is set to the adjusted value, and, finally, data is written. The processor 18 may be constructed as a microprocessor.

The optical disk device further comprises a processor circuit for decoding and outputting data from the replay RF signal and a servo circuit for extracting a focus error signal and tracking error signal and for controlling the focus and tracking of the optical pickup section 12, but these circuits will not be described in detail.

Figure 2:
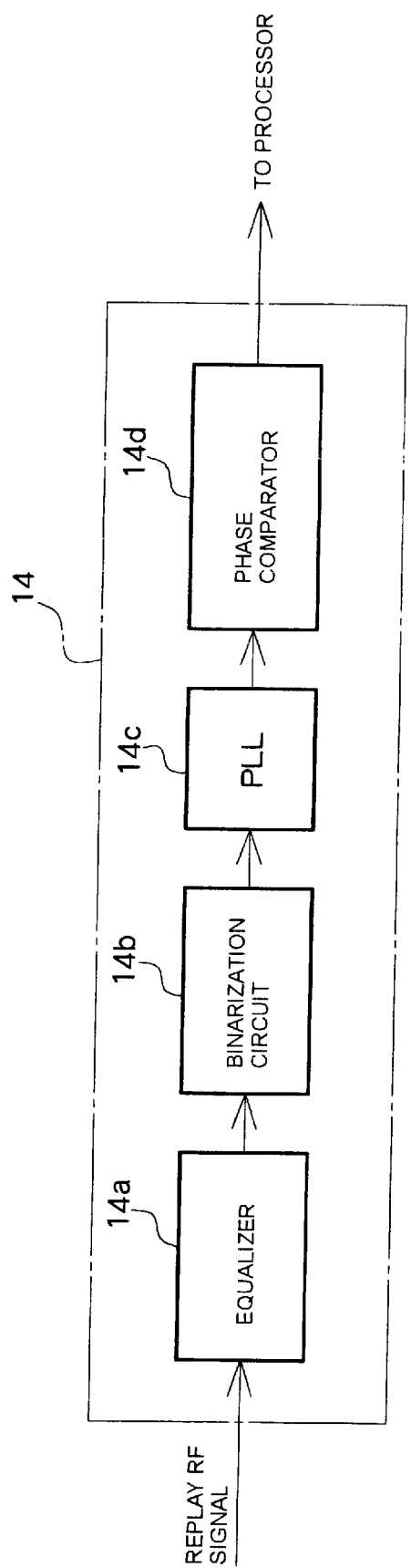
FIG. 2 is a block diagram of the jitter detector of FIG. 1.

FIG. 2 is a block diagram showing the structure of the jitter detector 14 of FIG. 1. The jitter detector 14 comprises an equalizer 14a for boosting a certain wavelength band of the replay RF signal, a binarization circuit 14b for binarizing the boosted RF signal, a PLL (Phase Locked Loop) circuit 14c for producing a clock signal from the binarized RF signal, and a phase comparator 14d for comparing the clock signal obtained by the PLL circuit 14c with the phase of the replay RF signal and for detecting the phase shift. The jitter signal from the phase comparator 14d is supplied to the processor 18.

Figure 3:
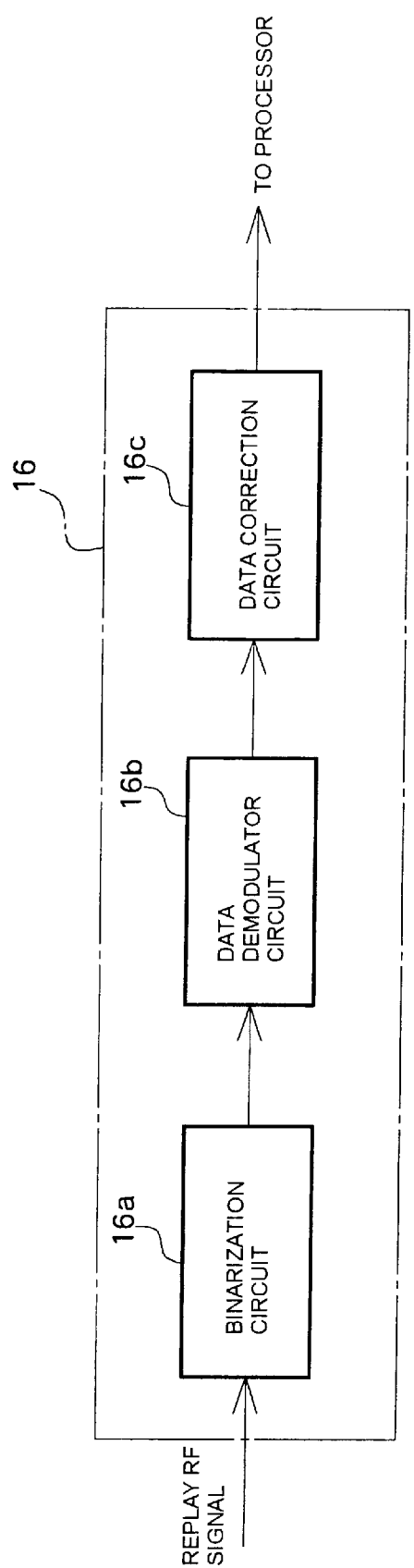
FIG. 3 is a block diagram of the error rate detector of FIG. 1.

FIG. 3 is a block diagram showing the components of the error rate detector 16 of FIG. 1. The error rate detector 16 comprises a binarization circuit 16a for binarizing the replay RF signal, a demodulator circuit 16b for demodulating data from the binarized RF signal, and an error correction circuit 16c for performing a predetermined error correction process on the demodulated replay data. The error correction circuit 16c calculates the number of bits for which the error is corrected through the error correction process and outputs the number as the error rate to the processor 18.

Figure 4A:
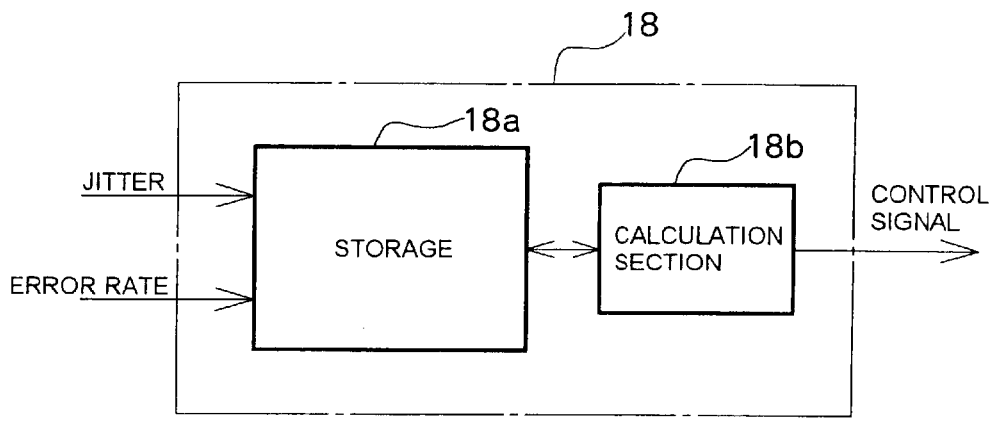
FIG. 4A is a block diagram of the processor of FIG. 1.

FIG. 4A is a block diagram showing the structure of the processor 18. The processor 18 comprises a storage section 18a and calculation section 18b. In FIG. 4A, components that are commonly present in a microprocessor such as, for example, a clock and an interface, are not drawn. The calculation section 18b adjusts, based on various parameters stored in the storage section 18a, the optimal focus offset for writing which was set when the device is shipped and outputs a control signal to the optical pickup section 12 to write data at the adjusted focus offset. In other words, the optimal focus offset set when the device is shipped is a focus offset set for the reference optical disk and the calculation section 18b adjusts the optical focus offset for the reference optical disk so that the focus offset is adapted for the optical disk onto which data is to be written (an optical disk different from the reference optical disk).

Figure 4B:
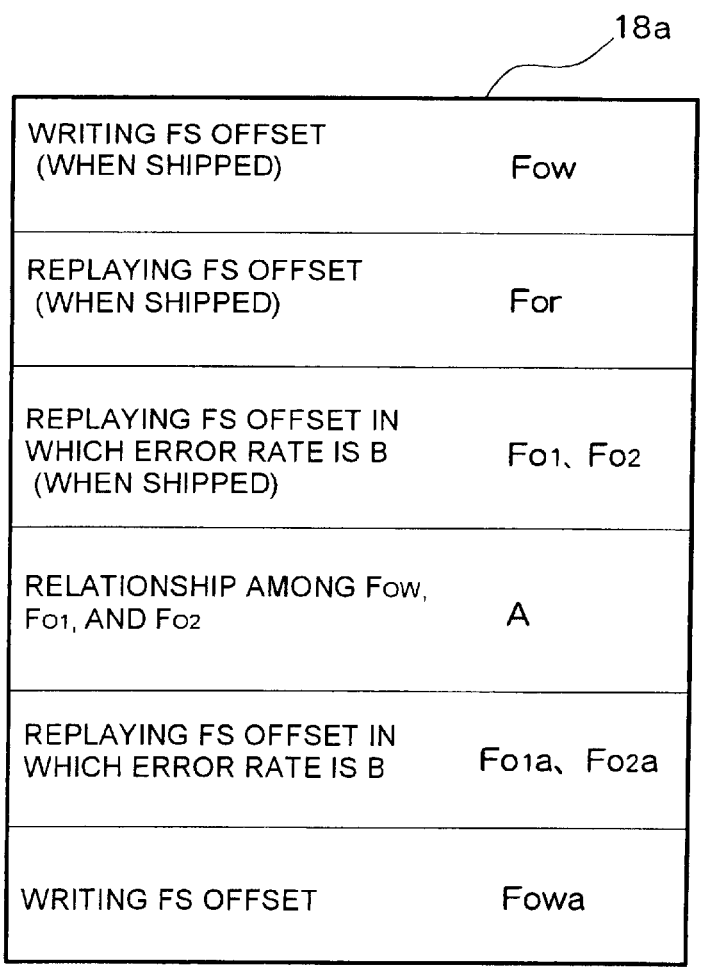
FIG. 4B is an explanatory diagram showing the contents of the storage section of FIG. 4A.

FIG. 4B shows data stored in the storage section 18a. The data stored in the storage section 18a can be classified into two categories, data stored when the device is shipped from the factory and data stored after the device was shipped. The data stored when the device is shipped is data related to the reference optical disk and the data stored after the shipping is data related to the optical disk onto which a user wishes to write. These categories of data will now be described.
(Data stored when the Device is Shipped from the Factory)

This data is set using the reference optical disk and include (1) the optimal focus offset Fow for writing, (2) the optimal focus offset For for replaying, (3) a minimum value FO1 and a maximum value FO2 for a range in which the error rate of signals obtained by writing a mark onto the reference optical disk at Fow and replaying the mark while varying the focus offset does not exceed a predetermined value B, and (4) a parameter A for defining the relationship between the range of focus offsets FO1–FO2 and the optimal focus offset Fow for writing.

The values FO1 and FO2 are obtained from changes in the error rate when the focus offset is varied, and can be considered to represent the error rate changes. The parameter A defines the position of Fow within the focus offset range in which the error rate does not exceed the predetermined value B, and indicates how far Fow is from FO1 or from FO2.
(Data Stored After the Device is Shipped)

This data are set using the optical disk onto which data is to be written, and include (5) a minimum value FO1a and a maximum value FO2a of a range in which the error rate of signals obtained by writing a mark onto the optical disk at Fow and replaying the mark while varying the focus offset does not exceed the predetermined value B, and (6) an optimal focus offset Fowa obtained by adjusting Fow according to the parameter A, FO1a, and FO2a.

Here, FO1 and FO2 are parameters related to the reference optical disk and FO1a and FO2a are parameters related to the optical disk onto which the data is to be written. In general, FO1 and FO2 differ from FO1a and FO2a, respectively. In the embodiment, Fow is adjusted using the parameter A based on the recognition that although the optimal focus offset for writing differs for every optical disk, the relationship between the optimal focus offset and the range of focus offset in which the error rate does not exceed the predetermined value B, that is, the value of the parameter A, is approximately a constant and independent of the optical disk.

Processing in the processor 18 according to the embodiment will now be described. For description purposes, the focus offset when writing will be referred to as "writing focus offset" and the focus offset for replaying will be referred to as "replaying focus offset".

Figure 5:
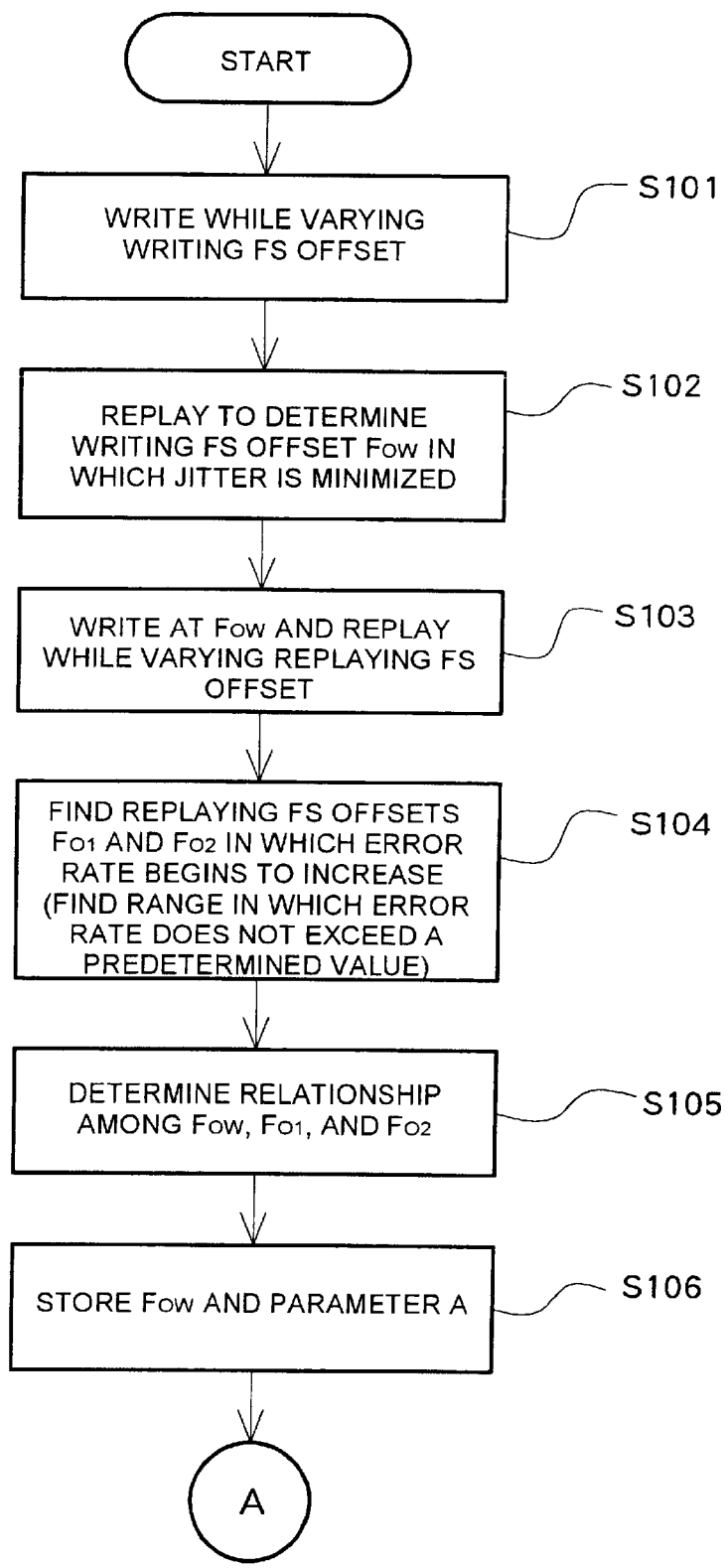
FIG. 5 is a flowchart of a process of the processor.
Figure 6:
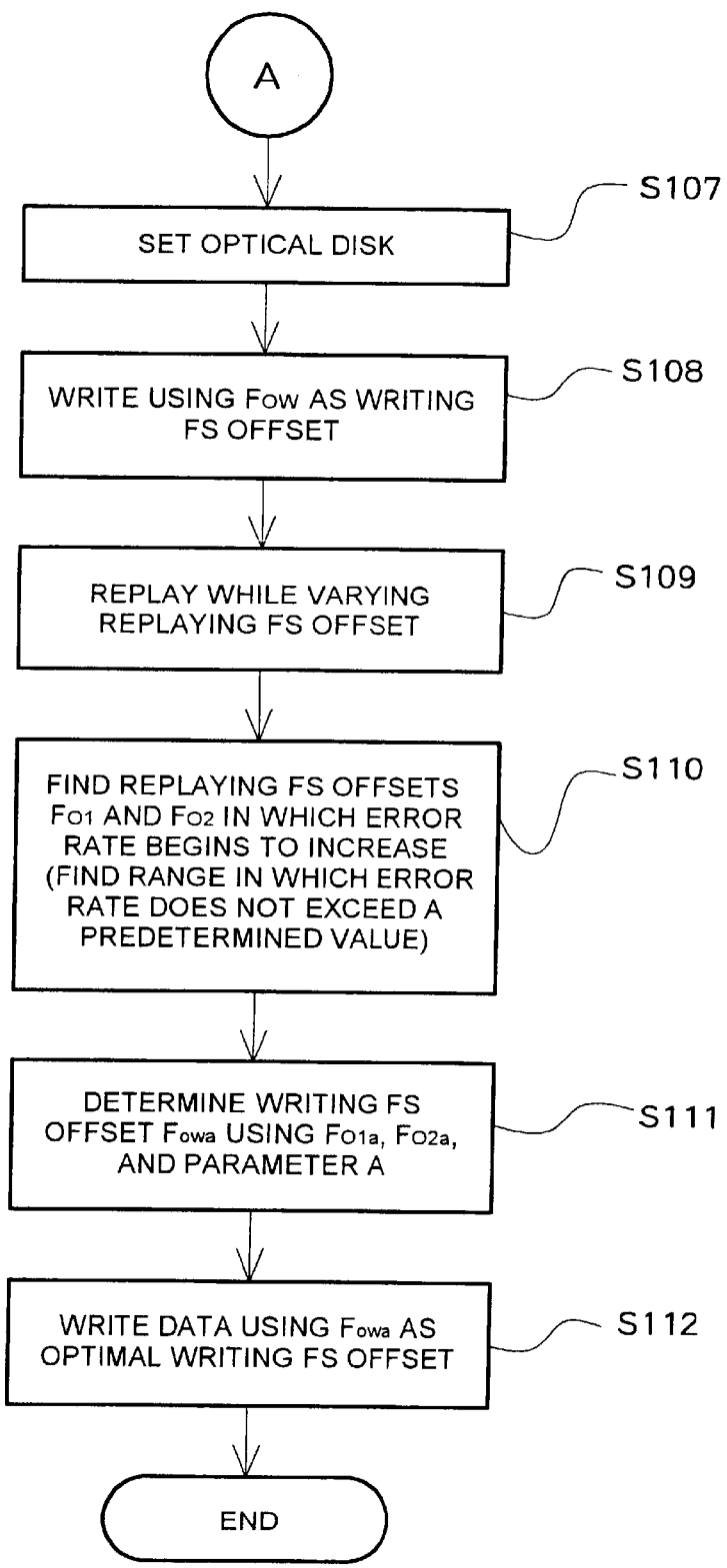
FIG. 6 is a flowchart continuing the process outlined in FIG. 5.

FIGS. 5 and 6 are flowcharts of a process in the processor 18. FIG. 5 shows the process when the device is shipped from the factory. First, a reference optical disk is loaded and marks are written while the writing focus (FS) offset is varied (step S101). Then, the written marks are replayed at a predetermined replaying FS offset and the amount of jitter is detected. The jitter changes with the writing FS offset, and, from the characteristic of the jitter, a writing FS offset Fow in which the jitter is minimized is determined (step S102). The writing FS offset thus determined is stored in the storage section 18a.

Next, a mark is written at the writing FS offset Fow and the written mark is replayed while the replaying focus (FS) output is varied (step S103). The error rate is detected while the replaying FS offset is varied. The error rate changes with the replaying FS offset, and has a characteristic that it is minimum near the optimal FS offset and rapidly increases (degrades) as the FS offset departs away from the optimal value. From this characteristic, replaying FS offsets FO1 and FO2 at which the error rate begins to rapidly increase are determined (step S104). FO1 is a lower (minimum) value and FO2 is an upper (maximum) value. This process can also be described as determining the range FO1–FO2 of the FS offset in which the error rate does not exceed a predetermined value B.

Figure 7:
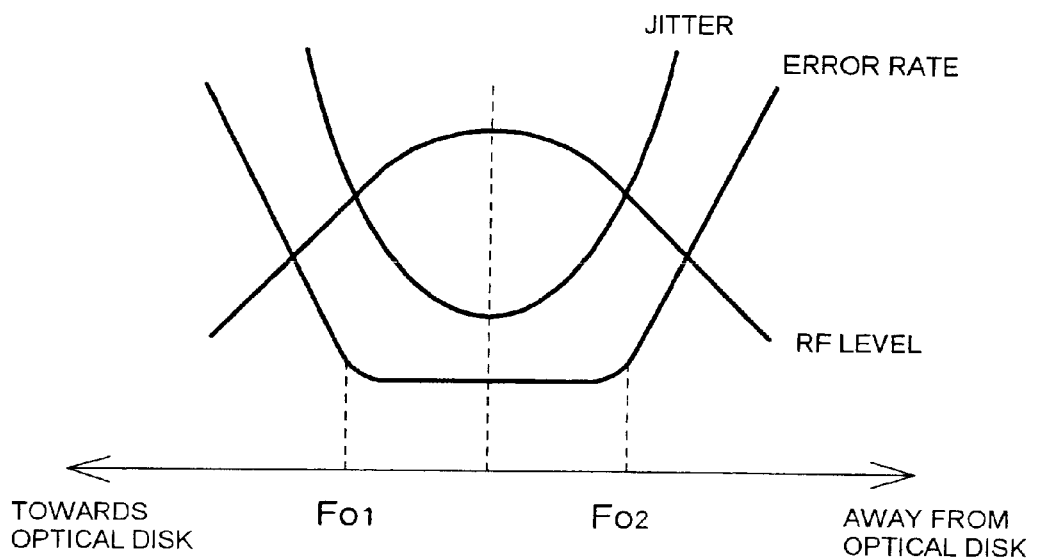
FIG. 7 is a graph showing changes in RF level, jitter, and error rate when the FS offset for replaying is varied.

FIG. 7 is a graph showing changes in the error rate when a mark is written at the writing FS offset Fow and the written mark is replayed while varying the replaying FS offset. In FIG. 7, changes in jitter and in RF level are also shown for reference. As shown, the error rate has a characteristic that it is minimized near the optimal replaying offset and rapidly increases as the FS offset departs away from the optimal value. The offset values in which the rapid increase in the error rate begins are FO1 and FO2, and these values may be considered as intrinsic to each of the optical disks.

Referring again to FIG. 5, after FO1 and FO2 are determined, the processor 18 determines the relationship among Fow, FO1, and FO2 (step S105). More specifically, it is calculated at what position the writing FS offset Fow is located within the range FO1–FO2 in which a predetermined error rate can be obtained when the replaying FS offset is varied. That is, a parameter A is calculated which satisfies the relationship, $$A = 100 \cdot (Fow - FO1)/(FO2 - FO1) \tag{Eq. 1}$$

The parameter A is a value between 0 and 100, with an A of 0 indicating that Fow is at the position of FO1, an A of 100 indicating that Fow is at the position of FO2, and an A of 50 indicating that Fow is at the midpoint between FO1 and FO2. The present inventors have found that although the values of the writing FS offset Fow, FO1, and FO2 are intrinsic to each optical disk, the relationship among Fow, FO1, and FO2 is remains almost uniformly constant even for different optical disks. After the parameter A is determined, the parameter A is stored in the storage section 18a (step S106). The process when the device is shipped from the factory is completed. The process after the device is shipped will now be described.

FIG. 6 is a flowchart showing processing in the processor 18 when a user writes data onto an optical disk. First, after the user inserts an optical disk (step S107), a mark is written at the writing FS offset Fow (step S108). This mark is not data which the user wishes to write, but is data used for determining the optimal writing FS offset of the optical disk, which is obviously a different disk from the reference optical disk used before shipping). Therefore, it is preferable that the mark be written in a test region formed in advance in a predetermined region of the optical disk.

After the mark (test data) is written, the mark is replayed while the replaying FS offset is varied so that the error rate may be detected (step S109). Similar to the processing at step S104, FS offsets FO1a and FO2a in which the error rate begins to rapidly increase are determined (step S110). The range FO1a–FO2a represents the range in which the error rate does not exceed a predetermined value. Because the optical disks are different, FO1 and FO2 are most likely to both differ from FO1a and FO2a.

Figure 8:
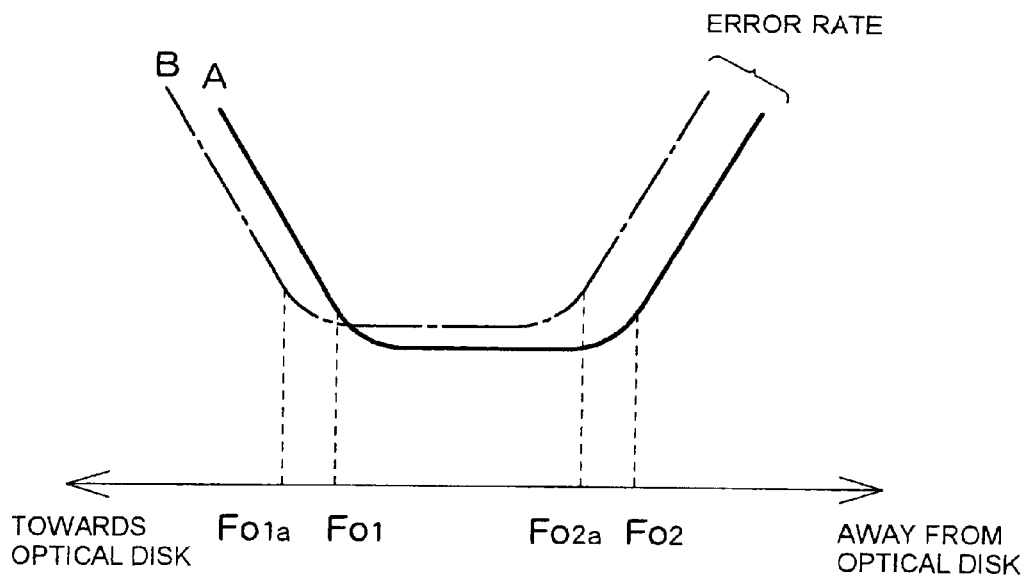
FIG. 8 is a graph showing changes in error rates when the focus (FS) offsets for replaying are varied for an optical disk A (reference optical disk) and an optical disk B (optical disk onto which the data is to be written).

FIG. 8 shows changes in error rates when the replaying FS offset is varied for an optical disk A (reference optical disk at the time of shipping) and for an optical disk B (the optical disk loaded by the user). The change characteristics of the error rates are similar for both optical disks A and B, with an exception that the FS offset value is shifted. This shift is caused by differences among the optical disks A and B, that is, differences in the physical shape or in the sensitivity of the writing film of the disks. The values FO1a and FO2a are stored in the storage section 18a.

Next, the processor 18 determines an optical writing FS offset for the loaded optical disk using FO1a, FO2a, and parameter A which are stored in the storage section 18a (step S111). More specifically, utilizing the property that the relationship among Fow, FO1, and FO2 is approximately identical even for different optical disks, Fow is adjusted to fit with the values FO1a and FO2a. That is, an optimal writing FS offset Fowa is calculated for the loaded optical disk using the equation, $$Fowa = FO1a + A \cdot (FO2a - FO1a)/100 \tag{Eq. 2}$$

After the optimal writing FS offset Fowa is calculated, the optimal writing FS offset Fowa is stored in the storage section 18a, and the data intended to be written is then written to the data region of the optical disk using the FS offset Fowa (step S112).

As described, according to the embodiment, it is not necessary to vary the writing FS offset and write data when a user is to write data onto an optical disk, and the optimal writing FS offset can be determined by simply varying the replaying FS offset. Because of this, accurate writing is possible.

The present embodiment has been described using the error rate as an example of the quality of the replay RF signal. However, the present invention is not limited to such a configuration, and it is also possible to use the jitter or the RF level as a measure of the quality of the replay RF signal. When the jitter is used, the parameter A can be calculated at step S104 by determining the range FO1–FO2 of FS offset in which the jitter does not exceed a predetermined value and Fow can be adjusted by determining, at step S110, the range FO1a–FO2a of FS offset in which the jitter does not exceed the predetermined value. The configuration for use of the RF level is similar to the above two configurations. That is, the parameter A can be calculated at step S104 by determining the range FO1–FO2 of FS offset in which the RF level is greater than or equal to a predetermined value and Fow can be adjusted by determining, at step S110, the range FO1a–FO2a of FS offset in which the RF level is greater than or equal to the predetermined value. When the jitter or the RF level is used, the error rate detector 16 shown in FIG. 1 is not necessary. However, as is clear from FIG. 7, although FO1, FO2, FO1a, and FO2a can be easily determined from the error rate because the error rate changes relatively rapidly with respect to the variation in the FS offset, it is more difficult to determine FO1 and FO2, and consequently FO1a and FO2a, because changes in jitter and in RF level are relatively gradual. This property should be taken into consideration when the jitter or RF level is used.

Figure 9:
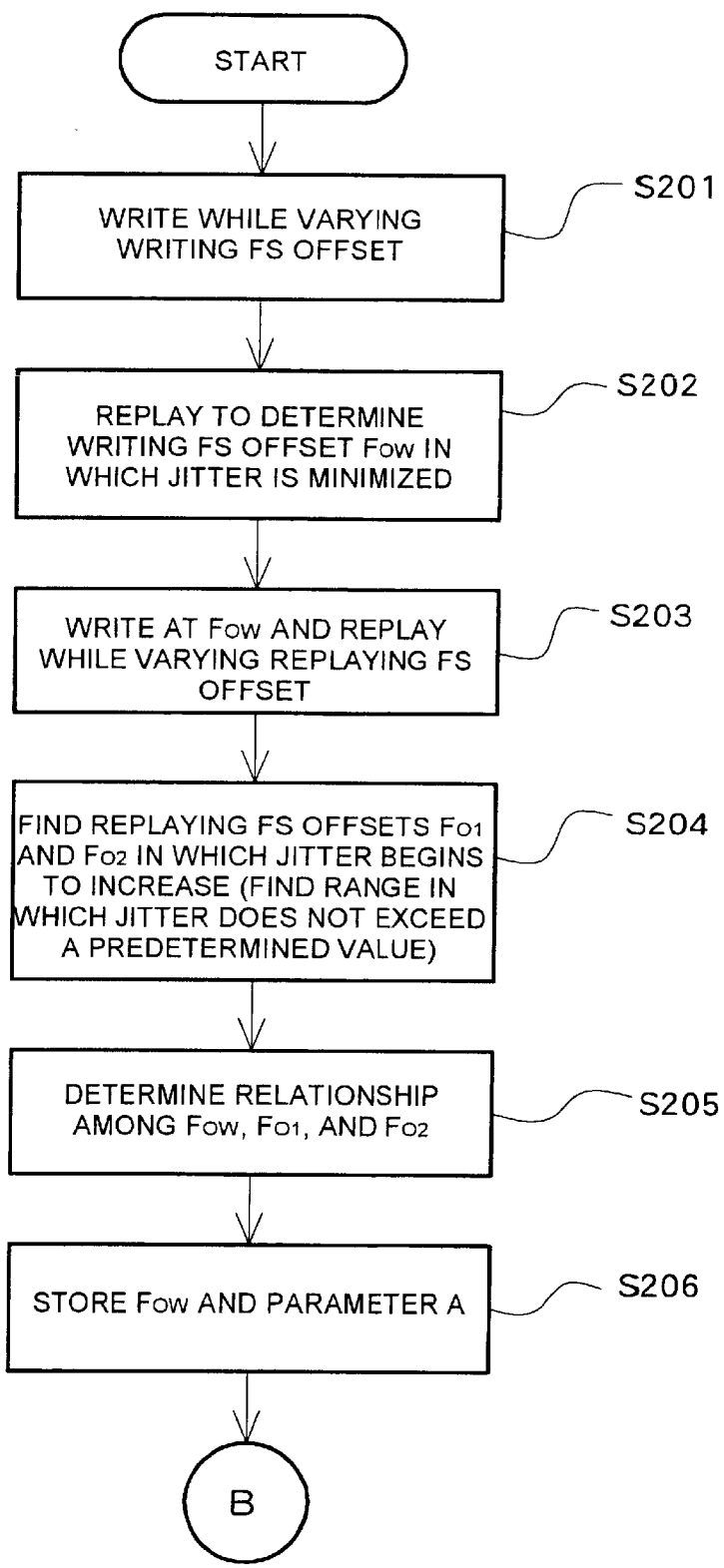
FIG. 9 is a flowchart of another process of the processor.
Figure 10:
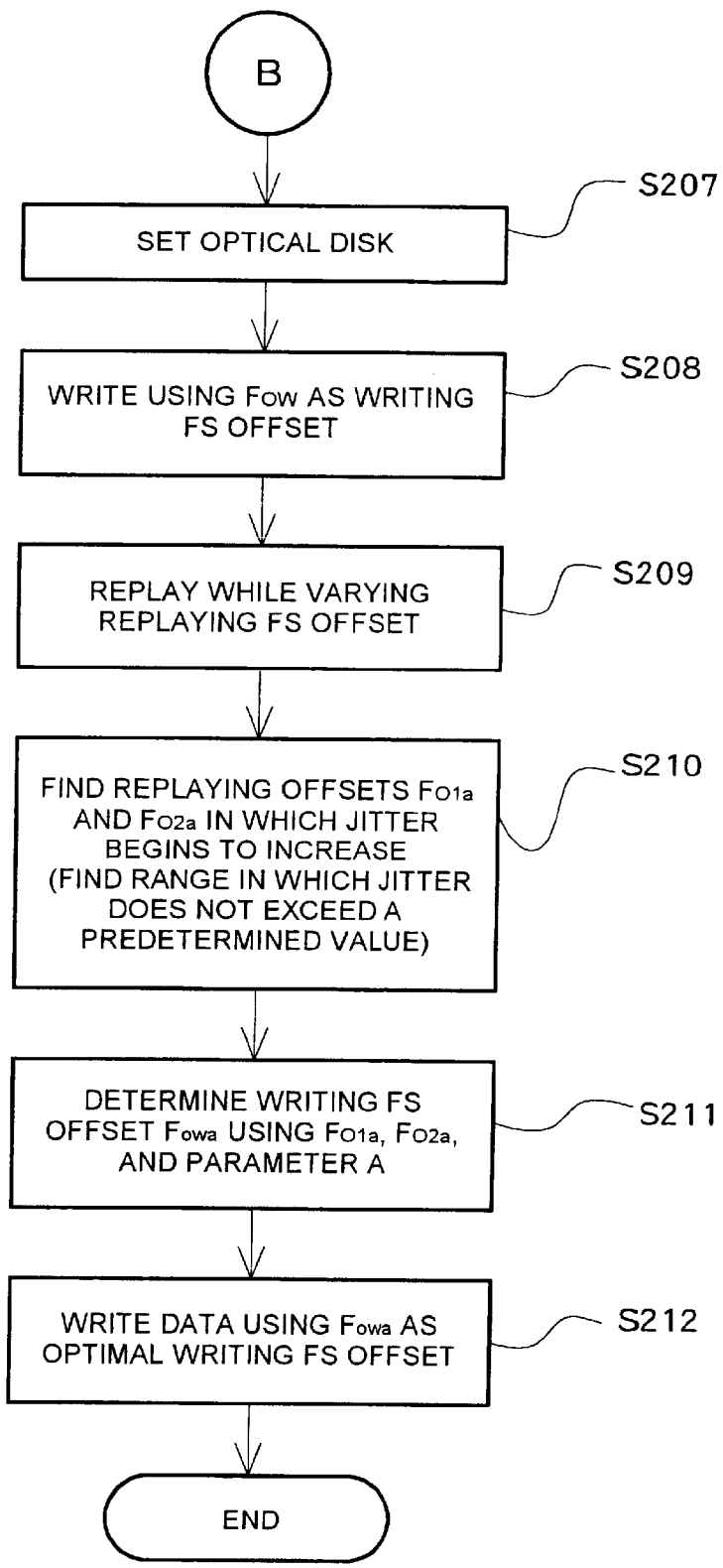
FIG. 10 is a flowchart continuing the process outlined in FIG. 9.

FIGS. 9 and 10 show flowcharts for the process when jitter, rather than error rate, is used for representing the quality of the replay RF signal. FIG. 9 shows the process when the device is shipped from a factory and corresponds to FIG. 5. Similarly, FIG. 10 shows the process after the device is shipped and corresponds to FIG. 6. In step S104 of FIG. 5, replaying FS offsets FO1 and FO2 are determined in which the error rate begins to rapidly increase. In step S204 of FIG. 9, on the other hand, replaying FS offsets FO1 and FO2 are determined in which the jitter begins to increase. In other words, step S204 can be considered as determining the range for FS offset in which the jitter does not exceed a predetermined value. In step S110 of FIG. 6, replaying FS offsets FO1a and FO2a are determined in which the error rate begins to rapidly increase. In step S210 of FIG. 10, on the other hand, replaying FS offsets FO1a and FO2a in which the jitter begins to increase are determined.

Figure 11:
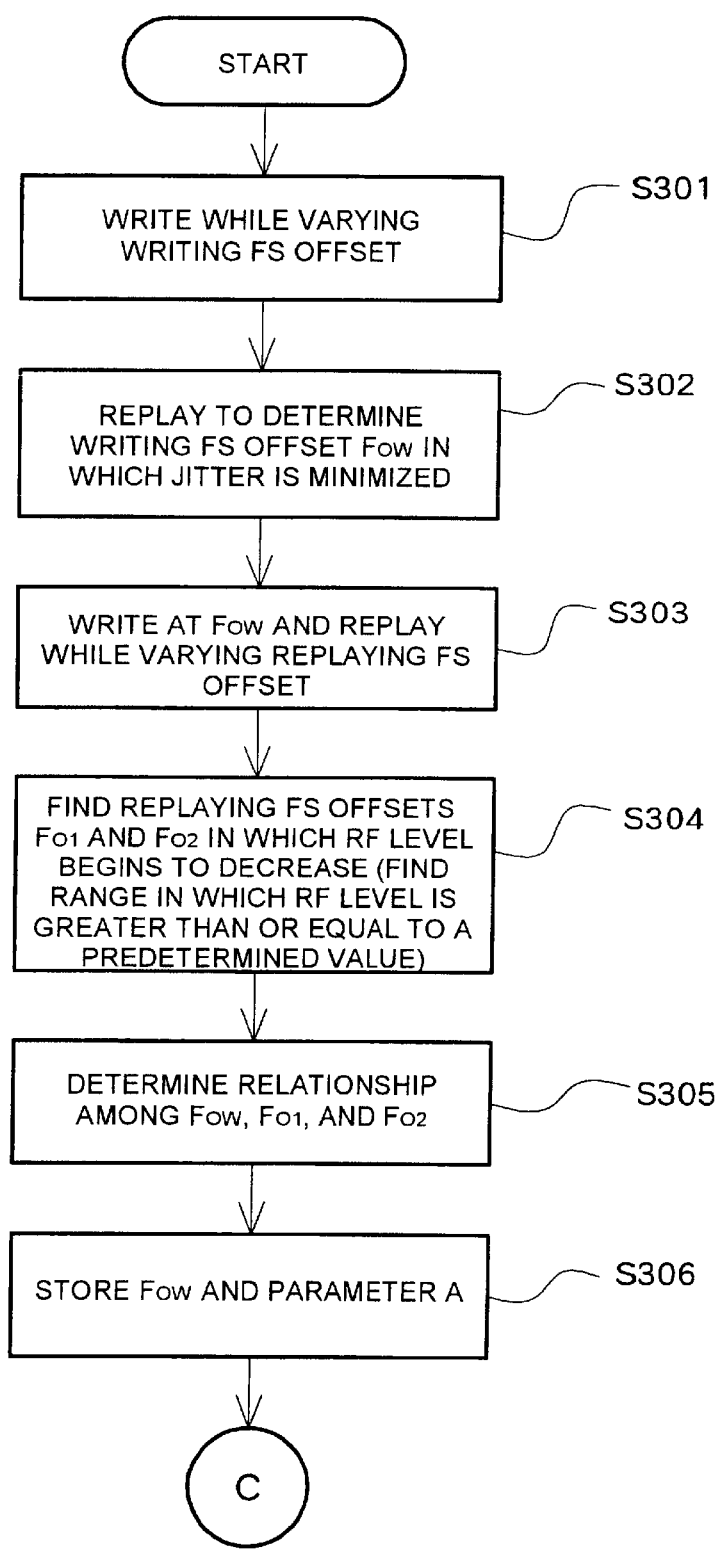
FIG. 11 is a flowchart of another process of the processor.
Figure 12:
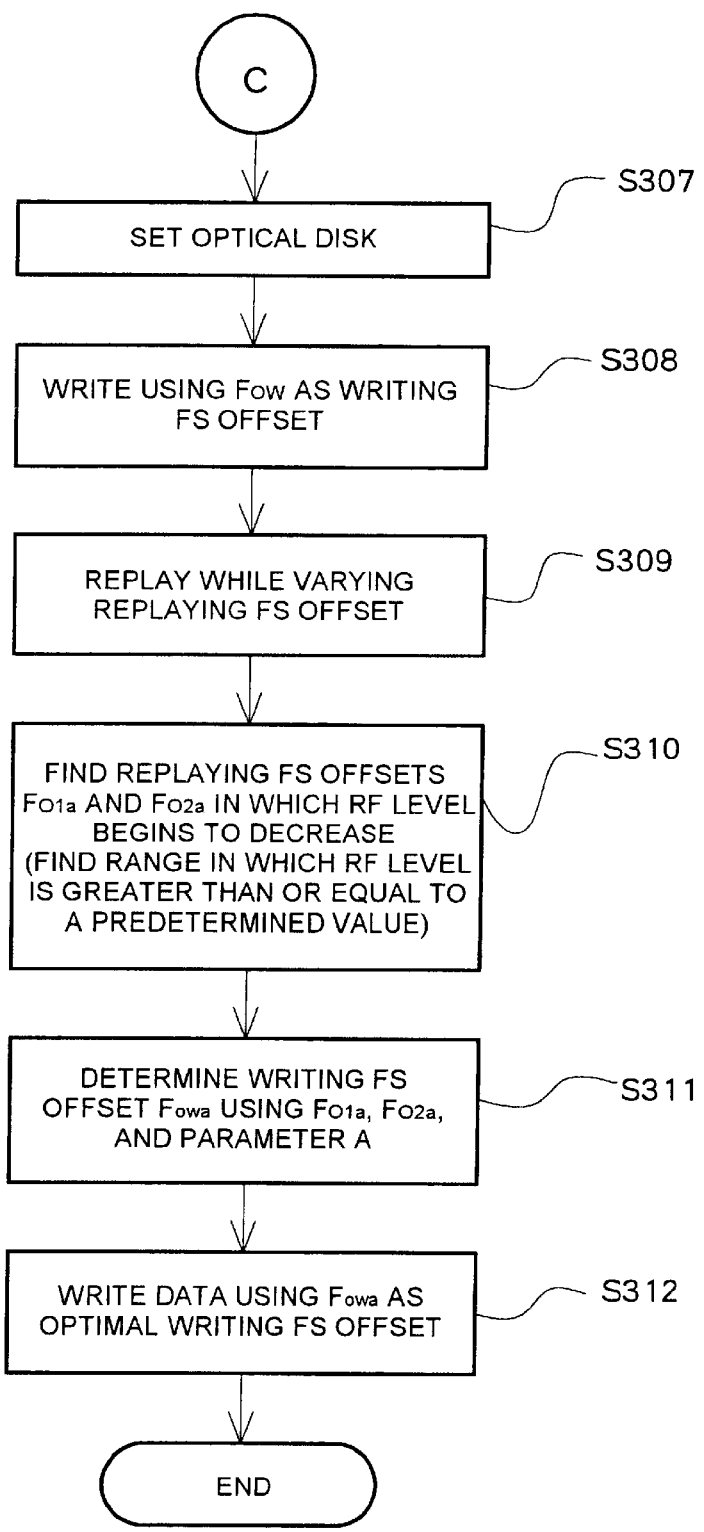
FIG. 12 is a flowchart continuing the process outlined in FIG. 11.

FIGS. 11 and 12 show flowcharts for processing when the RF level is employed as the quality of the replay RF signal in place of the error rate. FIG. 11, which corresponds to FIG. 5, shows the processing when the device is shipped from a factory and corresponds to FIG. 5. Similarly, FIG. 12 shows the processing after the device is shipped and corresponds to FIG. 6. In step S104 of FIG. 5, replaying FS offsets FO1 and FO2 are determined in which the error rate begins to rapidly increase. In step S304 of FIG. 11, on the other hand, replaying FS offsets FO1 and FO2 are determined in which the RF level starts to decrease. In other words, step S304 can be considered as determining the range for FS offset in which the RF level is greater than or equal to a predetermined value. In step S110 of FIG. 6, replaying FS offsets FO1a and FO2a are determined in which the error rate begins to rapidly increase. In step S310 of FIG. 12, on the other hand, replaying FS offsets FO1a and FO2a in which the RF level begins to decrease are determined.

In step S102, the FS offset in which jitter is minimized is set as the optimal writing FS offset Fow, but the present invention is not limited to such a configuration, and the error rate may be used in place of the jitter.

Figure 13:
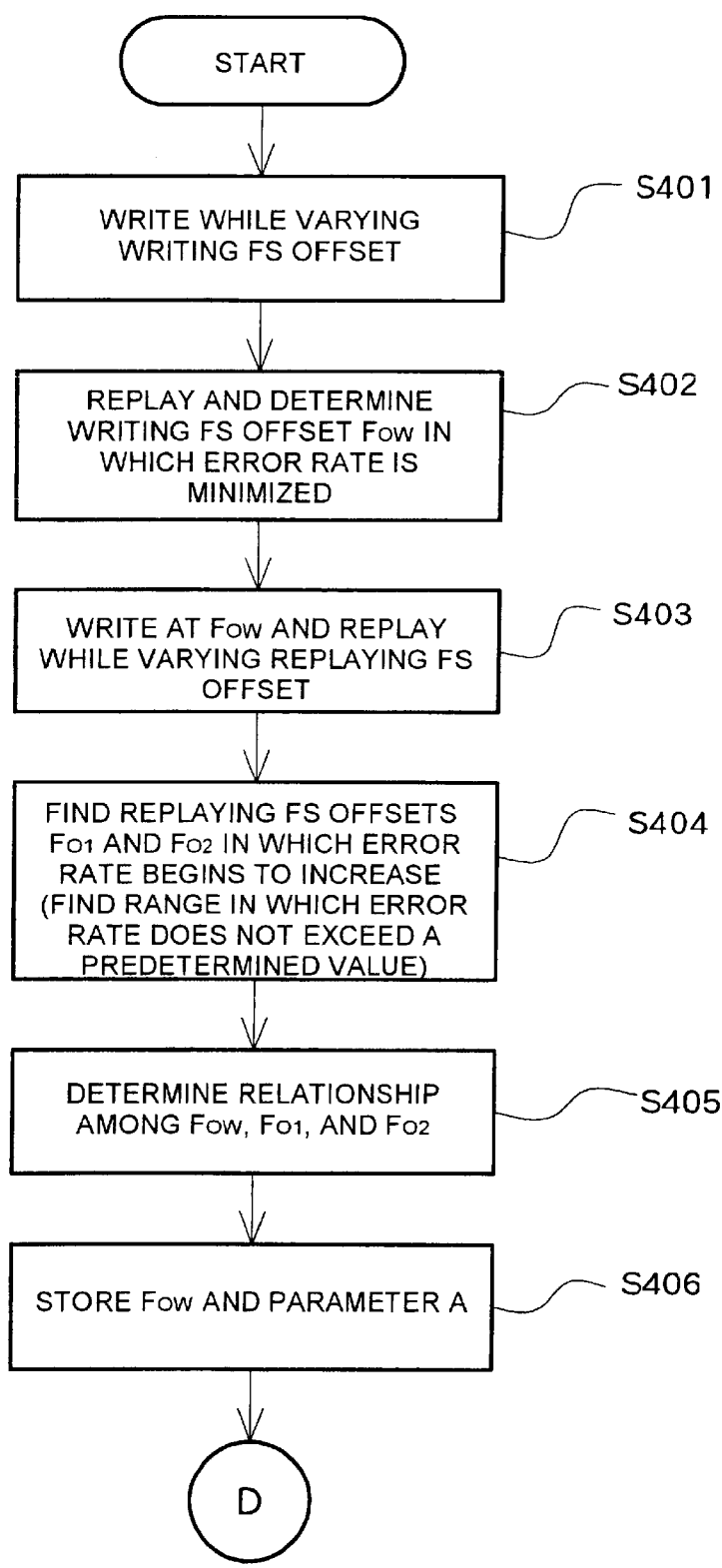
FIG. 13 is a flowchart showing further process of the processor.
Figure 14:
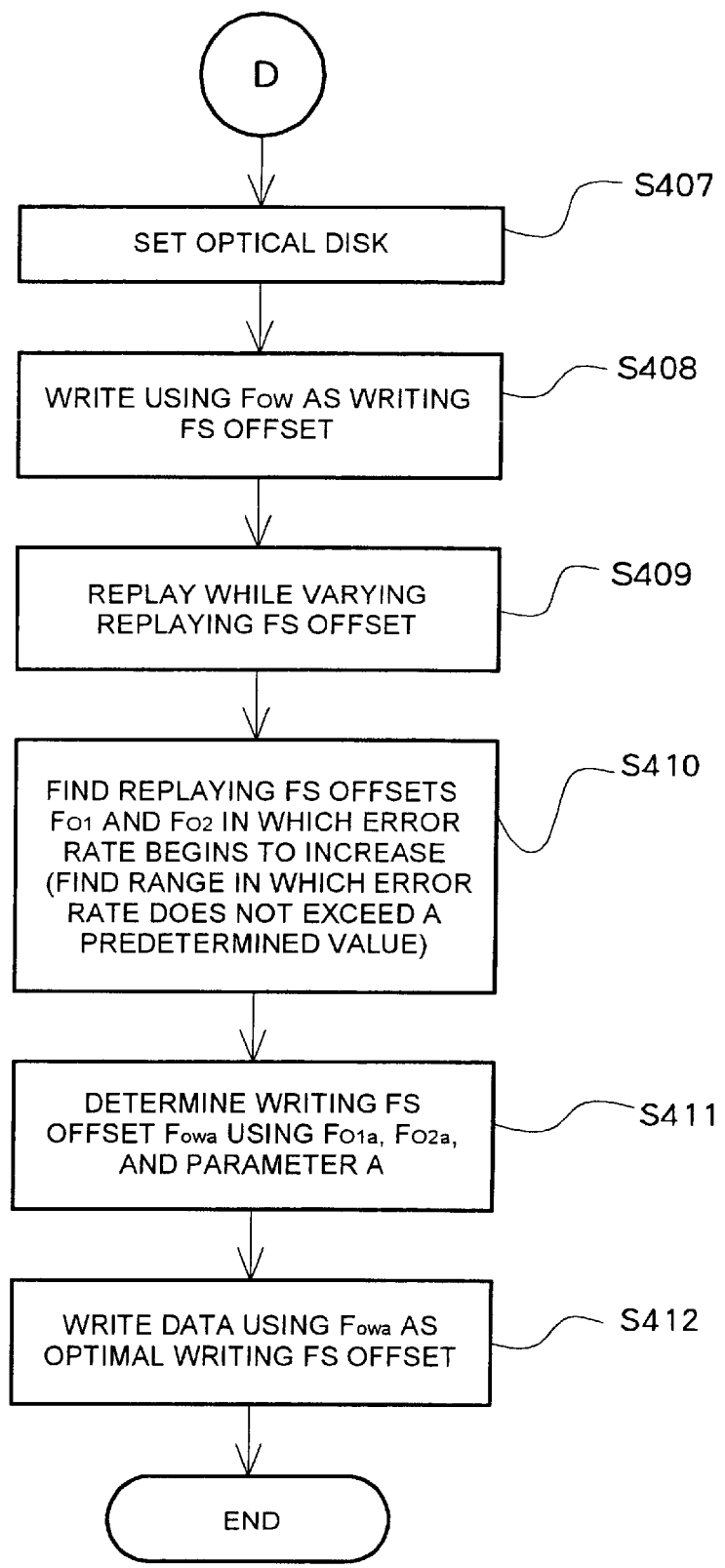
FIG. 14 is a flowchart showing the process of the processor continued from FIG. 13.
Figure 15:
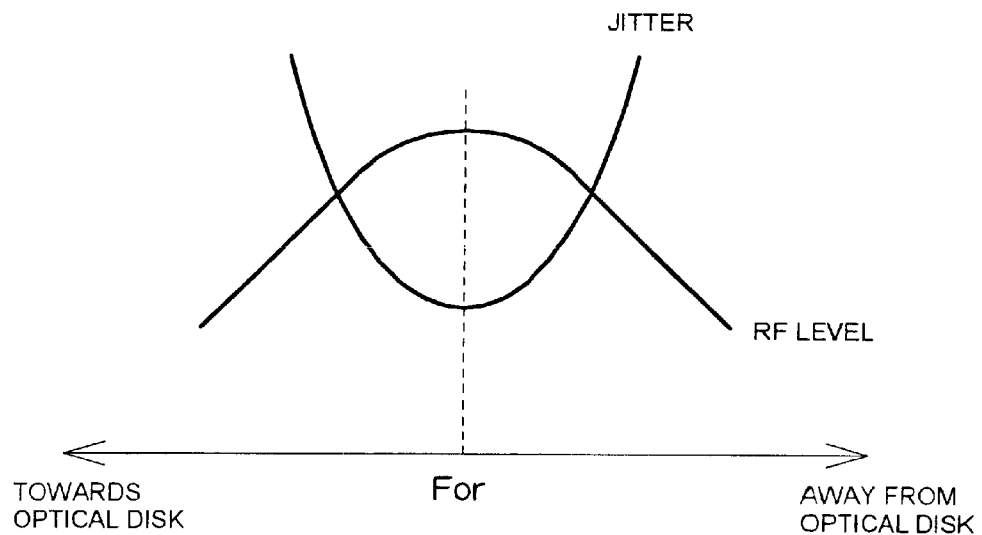
FIG. 15 is a graph showing changes in RF level and jitter when the focus (FS) offset for replaying is varied.

FIGS. 13 and 14 show flowcharts for the process in such a configuration. FIG. 13 shows the process performed before shipping and corresponds to FIG. 5. Similarly, FIG. 14 shows the process after the device is shipped and corresponds to FIG. 6. In step S102 of FIG. 5, a writing FS offset is determined in which the jitter is minimized. In step S402 of FIG. 13, on the other hand, a writing FS offset is determined in which the error rate is minimized. The process in FIG. 14 is identical to that in FIG. 6. In this configuration, the process can be performed using the error rate alone and jitter calculation is no longer necessary. Consequently, in this configuration, the jitter detector 14 need not be provided.

As described, although both jitter detector 14 and the error rate detector 16 are present in FIG. 1, it should be noted that the present invention can be practiced with either the jitter detector 14 alone or with the error rate detector 16 alone.

In the present embodiment, the parameter A is calculated using equation (1) and the FS offset Fow is adjusted based on equation (2). However, the present invention is not limited to such a configuration, and the relationship may be defined or the FS offset may be adjusted using other equations. For example, when it is known that A is approximately equal to 50, Fowa can be easily found by using $$Fowa = (FO1a + FO2a)/2 \tag{Eq. 3}$$

instead of equation (2).

Furthermore, when writing onto both lands and grooves of an optical disk 100, it is preferable to store writing FS offsets Fow and parameters A separately for the land and for the groove, for separately adjusting the FS offsets. With such a configuration, it is possible to easily determine the optimal FS offset for writing to the land and the optimal FS offset for writing onto the groove. It is also possible, instead of storing separate values for the land and for the groove, to store a single value for either one of land or groove and to determine the other value by multiplication by a predetermined coefficient in order to adjust the FS offsets.

What is claimed is:

1. A recordable optical disk device comprising:
    means for writing a mark onto an optical disk at a predetermined writing focus offset;
    means for replaying said mark while varying a replaying focus offset;

means for detecting a change in the quality of a replay signal with respect to the variation of said replaying focus offset; and means for adjusting said predetermined writing focus offset based on said change in the quality of the replay signal, wherein said means for writing writes data onto said optical disk at the writing focus offset adjusted by said means for adjusting.

2. A device according to claim 1, wherein said change in the quality of the replay signal with respect to the variation of said replaying focus offset is a change in the error rate with respect to the variation of said replaying focus offset.

3. A device according to claim 1, wherein said change in the quality of the replay signal with respect to the variation of said replaying focus offset is a change in jitter with respect to the variation of said replaying focus offset.

4. A device according to claim 1, wherein said change in the quality of the replay signal with respect to the variation of said replaying focus offset is a change in RF level with respect to the variation of said replaying focus offset.

5. A device according to claim 2, further comprising:

means for storing the relationship, for a reference optical disk, between said predetermined writing focus offset and said change in the error rate, wherein said means for adjusting adjusts said predetermined writing focus offset based on the relationship, for said reference optical disk, between said predetermined writing focus offset and said change in the error rate, and a change in the error rate, in said optical disk, with respect to the variation of said replaying focus offset.

6. A device according to claim 3, further comprising:

means for storing the relationship, for a reference optical disk, between said predetermined writing focus offset and said change in jitter, wherein said means for adjusting adjusts said predetermined writing focus offset based on said relationship, for said reference optical disk, between said predetermined writing focus offset and said change in jitter, and a change in jitter, in said optical disk, with respect to the variation of said replaying focus offset.

7. A device according to claim 4, further comprising:

means for storing the relationship, for a reference optical disk, between said predetermined writing focus offset and said change in the RF level, wherein said means for adjusting adjusts said predetermined writing focus offset based on said relationship, for said reference optical disk, between said predetermined writing focus offset and said change in the RF level, and a change in the RF level, in said optical disk, with respect to the variation of said replaying focus offset.

8. A device according to claim 2, further comprising:

means for storing a range for the replaying focus offset, for a reference optical disk, in which the error rate of a replay signal does not exceed a predetermined value, wherein said means for adjusting adjusts said predetermined writing focus offset based on the relationship, for said reference optical disk, between said predetermined writing focus offset and said range for the replaying focus offset, and a range of the replaying focus offset, in said optical disk, in which the error rate of a replay signal does not exceed a predetermined value.

9. A device according to claim 3, further comprising:

means for storing a range for the replaying focus offset, for a reference optical disk, in which the jitter of a replay signal does not exceed a predetermined value, wherein said means for adjusting adjusts said predetermined writing focus offset based on the relationship, for said reference optical disk, between said predetermined writing focus offset and said range for the replaying focus offset, and a range of the replaying focus offset, in said optical disk, in which the jitter of a replay signal does not exceed a predetermined value.

10. A device according to claim 4, further comprising:

means for storing a range of the replaying focus offset, for a reference optical disk, in which the RF level of a replay signal is greater than or equal to a predetermined value, wherein said means for adjusting adjusts said predetermined writing focus offset based on the relationship, for said reference optical disk, between said predetermined writing focus offset and said range of the replaying focus offset, and a range of the replaying focus offset, in said optical disk, in which the RF level of a replay signal is greater than or equal to a predetermined value.

11. A device according to claim 2, further comprising:

means for storing a range of the replaying focus offset, for a reference optical disk, in which the error rate of a replay signal does not exceed a predetermined value and a parameter, for said reference optical disk, indicating the positional relationship of said predetermined writing focus offset within said range of replaying focus offset, wherein said means for adjusting adjusts said predetermined writing focus offset based on a range of replaying focus offset, in said optical disk, in which the error rate of a replay signal does not exceed a predetermined value, and said parameter.

12. A device according to claim 3, further comprising:

means for storing a range of the replaying focus offset, for a reference optical disk, in which the jitter in a replay signal does not exceed a predetermined value, and a parameter, for said reference optical disk, indicating the positional relationship of said predetermined writing focus offset within said range of replaying focus offset, wherein said means for adjusting adjusts said predetermined writing focus offset based on a range of replaying focus offset, in said optical disk, in which the jitter of a replay signal does not exceed a predetermined value, and said parameter.

13. A device according to claim 4, further comprising:

means for storing a range of replaying focus offset, for a reference optical disk, in which the RF level of a replay signal is greater than or equal to a predetermined value, and a parameter, for said reference optical disk, indicating the positional relationship of said predetermined writing focus offset within said range of replaying focus offset, wherein said means for adjusting adjusts said predetermined writing focus offset based on a range of replaying focus offset, in said optical disk, in which the RF level of a replay signal is greater than or equal to a predetermined value, and said parameter.

14. A device according to claim 1, wherein
said predetermined writing focus offset is a focus offset, in a reference optical disk, in which the jitter of a replay signal is minimized.

15. A device according to claim 1, wherein
said predetermined writing focus offset is a focus offset, in a reference optical disk, in which the error rate of a replay signal is minimized.

16. A recordable optical disk device comprising:

means for storing a writing focus offset for a reference optical disk and a parameter indicating the positional relationship of said writing focus offset with respect to a minimum value and a maximum value of replaying focus offsets in which the error rate of a replay signal which is obtained by writing a mark onto said reference optical disk at said writing focus offset and replaying the mark is at a predetermined value;

means for writing a mark, at said writing focus offset, onto an optical disk to which data is to be written;

means for detecting a minimum value and a maximum value of replaying focus offsets in which the error rate of the replay signal obtained by replaying said mark is at a predetermined value; and means for setting the writing focus offset for said optical disk by adjusting said writing focus offset based on said minimum and maximum values of replaying focus offset and said parameter indicating the positional relationship.

17. A recordable optical disk device comprising:

means for storing a writing focus offset for a reference optical disk and a parameter indicating the positional relationship of said writing focus offset with respect to a minimum value and a maximum value of replaying focus offset in which the jitter of a replaying signal obtained by writing a mark, at said writing focus offset, onto said reference optical disk and replaying the mark is at a predetermined value;

means for writing a mark, at said writing focus offset, onto an optical disk to which data is to be written;

means for detecting a minimum value and a maximum value of replaying focus offset in which the jitter in a replay signal obtained by replaying said mark is at a predetermined value; and means for setting the writing focus offset for said optical disk by adjusting said writing focus offset based on said minimum and maximum values of the replaying focus offset and said parameter.

18. A recordable optical disk device, comprising:

means for storing a writing focus offset for a reference optical disk and a parameter indicating the positional relationship of said writing focus offset with respect to a minimum value and a maximum value of replaying focus offset in which the RF level of a replay signal obtained by writing a mark, at said writing focus offset, onto said reference optical disk and replaying the mark is at a predetermined value;

means for writing a mark, at said writing focus offset, onto an optical disk to which data is to be written;

means for detecting a minimum value and a maximum value of replaying focus offset in which the RF level of a replay signal obtained by replaying said mark is at a predetermined value; and means for setting the writing focus offset for said optical disk by adjusting said writing focus offset based on said minimum and maximum values of replaying focus offset and said parameter.

\* \* \* \* \*